United States Patent
Ma et al.

(10) Patent No.: US 10,938,549 B2
(45) Date of Patent: *Mar. 2, 2021

(54) SYSTEM AND METHOD FOR INFORMATION PROTECTION

(71) Applicant: ADVANCED NEW TECHNOLOGIES CO., LTD., Grand Cayman (KY)

(72) Inventors: Baoli Ma, Hangzhou (CN); Wenbin Zhang, Hangzhou (CN); Lichun Li, Hangzhou (CN); Zheng Liu, Hangzhou (CN); Shan Yin, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 121 days.

This patent is subject to a terminal disclaimer.

(21) Appl. No.: 16/342,181

(22) PCT Filed: Nov. 27, 2018

(86) PCT No.: PCT/CN2018/117548
§ 371 (c)(1),
(2) Date: Apr. 15, 2019

(87) PCT Pub. No.: WO2019/072275
PCT Pub. Date: Apr. 18, 2019

(65) Prior Publication Data
US 2020/0228317 A1    Jul. 16, 2020

(51) Int. Cl.
*H04L 29/06* (2006.01)
*H04L 9/06* (2006.01)

(52) U.S. Cl.
CPC ........ *H04L 9/0637* (2013.01); *H04L 2209/38* (2013.01)

(58) Field of Classification Search
CPC .... H04L 9/0637; H04L 9/0643; G06F 21/602
(Continued)

(56) References Cited

U.S. PATENT DOCUMENTS

| | | | |
|---|---|---|---|
| 4,926,480 | A | 5/1990 | Chaum |
| 7,509,498 | B2 | 3/2009 | Brickell |

(Continued)

FOREIGN PATENT DOCUMENTS

| | | | |
|---|---|---|---|
| CN | 106549749 | A | 3/2017 |
| CN | 106911470 | A | 6/2017 |

(Continued)

OTHER PUBLICATIONS

Written Opinion of the International Searching Authority and International Search Report for PCT Application No. PCT/CN2018/117548 dated Aug. 28, 2019 (7 pages).

(Continued)

*Primary Examiner* — Evans Desrosiers

(57) ABSTRACT

A computer-implemented method for information protection comprises: determining one or more data inputs and one or more data outputs for a transaction, wherein the data inputs are associated with input data types respectively, and the data outputs are associated with output data types respectively; encrypting the input data types and the output data types; committing each of the encrypted input data types and the encrypted output data types with a commitment scheme to obtain corresponding commitment values; obtaining at least a parameter R based at least on the commitment values; and submitting the transaction to one or more nodes in a blockchain network with disclosure of the parameter R and without disclosure of the input data types and output data types for the nodes to verify consistency between the input data types and the output data types.

17 Claims, 5 Drawing Sheets

(58) Field of Classification Search
USPC .......................................................... 713/168
See application file for complete search history.

(56) References Cited

U.S. PATENT DOCUMENTS

| | | | |
|---|---|---|---|
| 7,716,484 | B1 | 5/2010 | Kaliski, Jr. |
| 7,797,537 | B2 | 9/2010 | Kurita et al. |
| 8,316,237 | B1 | 11/2012 | Felsher et al. |
| 8,527,777 | B2 | 9/2013 | Camenisch et al. |
| 8,762,741 | B2 | 6/2014 | Chase et al. |
| 8,819,439 | B2 | 8/2014 | Camenisch et al. |
| 8,825,555 | B2 | 9/2014 | Gross et al. |
| 9,485,092 | B2 | 11/2016 | Smets et al. |
| 10,046,228 | B2 | 8/2018 | Tran et al. |
| 2003/0084291 | A1 | 5/2003 | Yamamoto et al. |
| 2003/0187684 | A1 | 10/2003 | Bartolini et al. |
| 2007/0116283 | A1 | 5/2007 | Tuyls et al. |
| 2007/0294183 | A1 | 12/2007 | Camenisch et al. |
| 2008/0235245 | A1 | 9/2008 | Huras et al. |
| 2009/0010439 | A1 | 1/2009 | Okamoto et al. |
| 2009/0119505 | A1 | 5/2009 | Ward et al. |
| 2009/0177591 | A1 | 7/2009 | Thorpe et al. |
| 2009/0281949 | A1 | 11/2009 | Coppinger |
| 2009/0305673 | A1 | 12/2009 | Mardikar |
| 2010/0142704 | A1 | 6/2010 | Camenisch et al. |
| 2012/0116978 | A1 | 5/2012 | Bruynse et al. |
| 2012/0209790 | A1 | 8/2012 | Szydlo |
| 2012/0278609 | A1 | 11/2012 | Camenisch et al. |
| 2012/0317034 | A1 | 12/2012 | Guha et al. |
| 2014/0201069 | A1 | 7/2014 | Arentz |
| 2014/0365776 | A1 | 12/2014 | Smets et al. |
| 2015/0033301 | A1 | 1/2015 | Pianese et al. |
| 2015/0206124 | A1 | 7/2015 | Aubin et al. |
| 2015/0371224 | A1 | 12/2015 | Lingappa |
| 2016/0292672 | A1 | 10/2016 | Fay et al. |
| 2016/0300234 | A1 | 10/2016 | Moss-pultz et al. |
| 2016/0306982 | A1 | 10/2016 | Seger, II et al. |
| 2016/0342976 | A1 | 11/2016 | Davis |
| 2016/0342978 | A1 | 11/2016 | Davis et al. |
| 2016/0358165 | A1 | 12/2016 | Maxwell |
| 2017/0004497 | A1 | 1/2017 | Mestré et al. |
| 2017/0033932 | A1 | 2/2017 | Truu et al. |
| 2017/0085555 | A1 | 3/2017 | Bisikalo et al. |
| 2017/0154331 | A1 | 6/2017 | Voorhees |
| 2017/0177898 | A1 | 6/2017 | Dillenberger |
| 2017/0228728 | A1 | 8/2017 | Sullivan |
| 2017/0236121 | A1 | 8/2017 | Lyons et al. |
| 2017/0243193 | A1 | 8/2017 | Manian et al. |
| 2017/0250972 | A1 | 8/2017 | Ronda et al. |
| 2017/0310653 | A1 | 10/2017 | Zhang |
| 2017/0316497 | A1 | 11/2017 | Song et al. |
| 2017/0353309 | A1 | 12/2017 | Gray |
| 2017/0372392 | A1 | 12/2017 | Metnick et al. |
| 2018/0006823 | A1 | 1/2018 | Carbajal et al. |
| 2018/0026784 | A1 | 1/2018 | Ward et al. |
| 2018/0032383 | A1 | 2/2018 | Surcouf et al. |
| 2018/0034634 | A1 | 2/2018 | Benarroch Guenun et al. |
| 2018/0089644 | A1 | 3/2018 | Chen et al. |
| 2018/0144114 | A1 | 5/2018 | Fiske |
| 2018/0167208 | A1 | 6/2018 | Le Saint et al. |
| 2018/0191503 | A1 | 7/2018 | Alwar et al. |
| 2018/0253702 | A1 | 9/2018 | Dowding |
| 2018/0293576 | A1 | 10/2018 | Song et al. |
| 2018/0294955 | A1 | 10/2018 | Hwan |
| 2018/0315309 | A1 | 11/2018 | Becker |
| 2018/0323974 | A1 | 11/2018 | Gao et al. |
| 2018/0331835 | A1 | 11/2018 | Daniel |
| 2018/0367298 | A1 | 12/2018 | Wright et al. |
| 2019/0052458 | A1 | 2/2019 | Wright et al. |
| 2019/0066228 | A1 | 2/2019 | Wright |
| 2019/0081796 | A1* | 3/2019 | Chow ........................ H04L 9/30 |
| 2019/0130399 | A1 | 5/2019 | Wright et al. |
| 2019/0164153 | A1 | 5/2019 | Agrawal et al. |
| 2019/0171744 | A1* | 6/2019 | Ananthapur Bache ..................... H04L 9/0637 |
| 2019/0172057 | A1 | 6/2019 | Vincent |
| 2019/0180275 | A1* | 6/2019 | Safak ................. G06Q 20/3827 |
| 2019/0205873 | A1 | 7/2019 | Kamalsky et al. |
| 2019/0236879 | A1 | 8/2019 | Ivanov et al. |
| 2019/0244195 | A1 | 8/2019 | Ma et al. |
| 2019/0268312 | A1 | 8/2019 | Ma et al. |
| 2019/0287095 | A1 | 9/2019 | Gaddam et al. |
| 2019/0327216 | A1 | 10/2019 | Walters |
| 2019/0386940 | A1* | 12/2019 | Hong .................... H04L 9/0631 |
| 2020/0042726 | A1 | 2/2020 | Lawrenson et al. |
| 2020/0051361 | A1 | 2/2020 | Cui et al. |
| 2020/0053054 | A1 | 2/2020 | Ma et al. |

FOREIGN PATENT DOCUMENTS

| | | |
|---|---|---|
| CN | 107025602 A | 8/2017 |
| CN | 107077670 A | 8/2017 |
| CN | 108512650 A | 9/2017 |
| CN | 107239951 A | 10/2017 |
| CN | 107451175 A | 12/2017 |
| CN | 107679857 A | 2/2018 |
| CN | 108062671 A | 5/2018 |
| CN | 108282459 A | 7/2018 |
| CN | 108288159 A | 7/2018 |
| CN | 108320228 A | 7/2018 |
| CN | 108418689 A | 8/2018 |
| CN | 108683669 A | 10/2018 |
| CN | 108711105 A | 10/2018 |
| CN | 108764874 A | 11/2018 |
| CN | 108876332 A | 11/2018 |
| CN | 109003184 A | 12/2018 |
| EP | 0773647 A2 | 5/1997 |
| EP | 3576033 A1 | 12/2019 |
| JP | 2000-207466 A | 7/2000 |
| JP | 2000-299683 A | 10/2000 |
| JP | 2007-510947 A | 4/2007 |
| JP | 2007-226777 A | 9/2007 |
| JP | 2010-135928 A | 6/2010 |
| JP | 2013-98666 A | 5/2013 |
| JP | 2018-055203 A | 4/2018 |
| JP | 2018-157432 A | 10/2018 |
| JP | 2020-71617 A | 5/2020 |
| KR | 10-2016-0024185 A | 3/2016 |
| KR | 10-1802655 B1 | 11/2017 |
| RU | 2536666 C2 | 12/2014 |
| RU | 2636105 C1 | 11/2017 |
| RU | 2651245 C2 | 4/2018 |
| TW | 201733303 A | 9/2017 |
| TW | 201810151 A | 3/2018 |
| TW | M561861 U | 6/2018 |
| TW | I636411 B | 9/2018 |
| WO | 0180479 A1 | 10/2001 |
| WO | 2002/039391 A2 | 5/2002 |
| WO | 2006121322 A1 | 11/2006 |
| WO | 2009151832 A2 | 12/2009 |
| WO | 2013049689 A1 | 4/2013 |
| WO | 2016/200885 A1 | 12/2016 |
| WO | 2017/145016 A1 | 8/2017 |
| WO | 2017145010 A1 | 8/2017 |
| WO | 2017178956 A1 | 10/2017 |
| WO | 2018019364 A1 | 2/2018 |
| WO | 2018126065 A1 | 7/2018 |
| WO | 2018/168152 A1 | 9/2018 |
| WO | 2018185724 A1 | 10/2018 |
| WO | 2018189634 A1 | 10/2018 |
| WO | 2018189667 A1 | 10/2018 |
| WO | 2018193355 A1 | 10/2018 |
| WO | 2018203186 A1 | 11/2018 |
| WO | 2018207064 A1 | 11/2018 |
| WO | 2018229632 A1 | 12/2018 |

OTHER PUBLICATIONS

Written Opinion of the International Searching Authority and International Search Report for PCT Application No. PCT/CN2018/117552 dated Aug. 27, 2019 (7 pages).

(56) References Cited

OTHER PUBLICATIONS

Written Opinion of the International Searching Authority and International Search Report for PCT Application No. PCT/CN2018/117558 dated Aug. 28, 2019 (6 pages).
Written Opinion of the International Searching Authority and International Search Report for PCT Application No. PCT/CN2018/117560 dated Aug. 27, 2019 (7 pages).
Written Opinion of the International Searching Authority and International Search Report for PCT Application No. PCT/CN2018/117571 dated Aug. 27, 2019 (6 pages).
First Office Action for Chinese Application No. 201810887463.2 dated May 27, 2019 with English machine translation (10 pages).
Second Office Action for Chinese Application No. 201810887463.2 dated Sep. 29, 2019 with English machine translation (8 pages).
Written Opinion of the International Searching Authority and International Search Report for PCT Application No. PCT/US2019/045090 dated Oct. 16, 2019 (12 pages).
Gibson, "An investigation into Confidential Transactions," Jul. 12, 2018, retrieved from the internet: https://github.com/AdamISZ/ConfidentialTransactionsDoc/raw/master/essayonCT.pdf (22 pages).
Sun et al., "RingCT 2.0: A Compact Accumulator-Based (Linkable Ring Signature) Protocol for Blockchain Cryptocurrency Monero," International Conference on Computer Analysis of Images and Patterns, Aug. 12, 2017 (20 pages).
Bunz et al., "Bulletproofs: Short Proofs for Confidential Transactions and More," IEEE Symposium on Security and Privacy (SP), May 20, 2018 (20 pages).
First Search for Chinese Application No. 201810887463.2 dated May 14, 2019 (1 page).
Franca, Homomorphic Mini-blockchain Scheme, 2015) (Year: 2015).
Written Opinion for PCT Application No. PCT/US2019/045090 dated Mar. 11, 2020 (5 pages).
Examination Report No. 1 for Australian Application No. 2018322507 dated Feb. 5, 2020 (6 pages).
Poelstra A. et al, 'Confidential assets' In: International Conference on Financial Cryptography and Data Security Feb. 26, 2018 (pp. 43-63). Springer, Berlin, Heidelberg.
Engelmann F . et al, 'Coloured Ring Confidential Transactions' In: Data Privacy Management, Cryptocurrencies and Blockchain Technology Sep. 6, 2018 (pp. 188-196). Springer, Cham.
Seguias Bek 'Monero's Building Blocks' [Retrieved from internet on Jan. 29, 2020] <URL: https://delfr.com/category/monero/> Jun. 18, 2018.
Search Report for European Application No. 18863802.7 dated Jan. 29, 2020 (5 pages).
Examination Report for European Application No. 18863802.7 dated Feb. 12, 2020 (6 pages).
Li Bin et al., "RZKPB: A Privacy-Preserving Blockchain-Based Fair Transaction Method for Sharing Economy," 2018 17th IEEE International Conference on Trust, Security, and Privacy in Computing and Communications, IEEE, Aug. 1, 2018 (6 pages).
Ian Miers et al., "Zerocoin: Anonymous Distributed E-Cash from Bitcoin," Security and Privacy, IEEE, May 19, 2013 (15 pages).
Examination Report No. 1 for Australian Application No. 2018327218 dated Feb. 6, 2020 (8 pages).
Search Report for European Application No. 18863790.4 dated Jan. 24, 2020 (8 pages).
Decision on Grant for Russian Application No. 2019111969 dated Feb. 12, 2020 (29 pages).
Examination Report No. 1 for Australian Application No. 2018347195 dated Feb. 4, 2020 (6 pages).
First Office Action for Canadian Application No. 3040357 dated Feb. 17, 2020 (6 pages).
Examination Report for European Application No. 18865370.3 dated Feb. 12, 2020 (8 pages).
Non-Final Office Action for U.S. Appl. No. 16/708,329 dated Mar. 19, 2020 (16 pages).
Maxwell (Greg Maxwell, "Confidential transactions", 2015, found at https://people.xiph.org/-greg/confidential_values.txt).
Examination Report for Eurpoean Application No. 18865369.5 dated Feb. 12, 2020 (5 pages).
Office Action and Search Report for Russian Application No. 2019111930 dated Feb. 13, 2020 (15 pages).
Jadhav H., Chandre P., Association rule mining methods for applying encryption techniques in transaction dataset, 2016 International Conference on Computer Communication and Informatics (ICCCI), Jan. 7-9, 2016, Coimbatore, India.
Office Action and Search Report for Russian Application No. 2019111926 dated Jan. 15, 2020 (19 pages).
Preinterview first office action for U.S. Appl. No. 16/709,770 dated Feb. 5, 2020.
First action interview—office action for U.S. Appl. No. 16/709,770 dated Mar. 12, 2020.
Office Action for Canadian Application No. 3040791 dated Mar. 2, 2020 (5 pages).
Examination Report for European Application No. 18865371.1 dated Feb. 12, 2020 (5 pages).
Decision on Grant for Russian Application No. 2019111929 dated Jan. 30, 2020 (26 pages).
Decision on Grant for Russian Application No. 2019111923 dated Mar. 23, 2020.
Supplementary Search for Chinese Application No. 201810887463.2 dated Nov. 21, 2019 (1 page).
Third Office Action for Chinese Application No. 201810887463.2 dated Dec. 20, 2019 with English machine translatoin (7 pages).
Search Report for European Application No. 18865370.3 dated Jan. 21, 2020 (5 pages).
Shen, "Ring Confidential Transactions," Shen Noether-Monero Research Labs, Jan. 1, 2015 (34 pages).
Ma et al., "An Efficient NIZK Scheme for Privacy-Preserving Transactions over Account-Model Blockchain," Sep. 4, 2014 (12 pages).
First Examination Report for Australian Application No. 2018347196 dated Jan. 20, 2020 (3 pages).
Search Report for European Application No. 18865369.5 dated Jan. 24, 2020 (4 pages).
First Examination Report for Australian Application No. 2018347197 dated Jan. 20, 2020 (3 pages).
Search Report for European Application No. 18865371.1 dated Jan. 24, 2020 (4 pages).
Notice of Allowance for U.S. Appl. No. 16/342,713 dated Apr. 2, 2020.
Notice of Allowance for U.S. Appl. No. 16/708,249 dated Apr. 8, 2020.
Notice of Allowance for U.S. Appl. No. 16/708,329 dated Apr. 8, 2020.
Office Action for Canadian Application No. 3037833 dated Apr. 28, 2020.
Office Action for Japanese Application No. 2019-521112 dated Apr. 7, 2020.
Office Action for Canadian Application No. 3040601 dated May 5, 2020.
Search Report for Taiwanese Application No. 108110709 dated Apr. 24, 2020.
Notice of Allowance for Japanese Application No. 2019-520853 dated May 19, 2020.
Pedersen, T. P., "Non-Interactive and Information-Theoretic Secure Verifiable Secret Sharing", Advances in Cryptology—CRYPTO'91, Springer-Verlag, Aug. 1991.
Notice of Allowance for Korean Application No. 10-2019-7011443 dated Jun. 12, 2010.
Notice of Allowance for Japanese Application No. 2019-520982 dated Jun. 16, 2020.
Yoshihama et al., "Integrity and privacy protection in distributed ledger technology", Oct. 16, 2017, CSS 2017 Computer Securitry Symposium 2017. [English abstract provided].
Written Opinion for Singaporean Application No. 11201902778U dated May 26, 2020.
Tam Le et al., "CapChain: A Privacy Preserving Access Control Framework Based on Blockchain for Pervasive Environments". 2018 IEEE International Conference on Smart Computing SMARTCOMP, Jun. 20, 2018, pp. 57-64.

(56) References Cited

OTHER PUBLICATIONS

Office Action for Korean Application No. 10-2019-7011444 dated Jun. 2, 2020.
Alfred J. Menezes, Handbook of Applied Cryptography, CRC Press, 1996.
Written Opinion for Singaporean Application No. 11201903425P dated Jun. 2, 2020.
FRIIS, Digicash implementation. thesis, Jun. 4, 2003.
Written Opinion for Singaporean Application No. 11201903438T dated May 26, 2020.
Office Action for Korean Application No. 10-2019-7011446 dated Jun. 10, 2020.
Final Office Action for U.S. Appl. No. 16/738,055 dated Jul. 2, 2020.
Written Opinion for Singaporean Application No. 11201902773V dated Jun. 2, 2020.
Office Action for Canadian Application No. 3040611 dated Apr. 30, 2020.
Office Action for Korean Application No. 10-2019-7011447 dated Sep. 1, 2020.
Search Report for Taiwanese Application No. 108125043 dated May 4, 2020.
Search Report for Taiwanese Application No. 108125044 dated Aug. 19, 2020.
Office Action for Japanese Application No. 2019-520859 dated Sep. 15, 2020.
Aganuma Ken et al.,"Decentralized netting protocol over Hyperledger Fabric", Abstracts of 2018 Symposium on Cryptography and Information Security (SCIS2018), The Institute of Electronics, Information and Communication Engineers, Jan. 23, 2018, p. 1-6, Refer specifically to "4.1 Channel Structure", "Appendix A:Pedersen commitment", Appendix B:Malicious, Responding to . . .Nodes.
Andreas M. Antonopoulos, Mastering Bitcoin, NTT Publishing Co., Ltd., Jul. 21, 2016, First edition, pp. 20-21, ISBN 978-7571-0367-2, Refer specifically to "general transaction format".
Office Action for Japanese Application No. 2019-520976 dated Oct. 6, 2020.
Gertner et al., "Publicly-Verifiable SignCryption," Committing Encryption and Public-Verifiable SignCryption, Cryptology ePrint Archive, Dec. 16, 2003.

\* cited by examiner

Initiator node initiate a transaction to be added to the blockchain
1. Initiate transaction
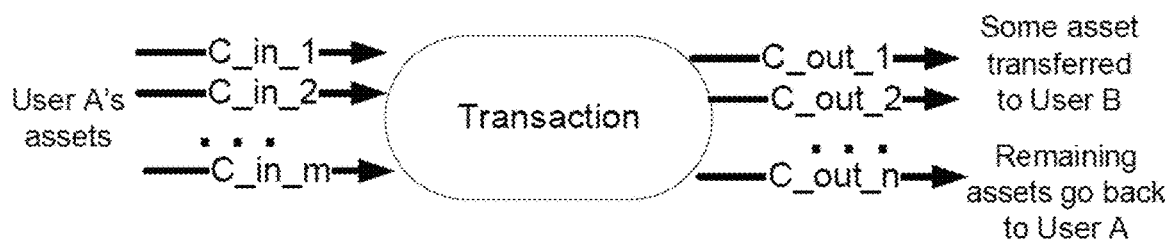
2. Calculate x, C, and R, and publish R to the nodes
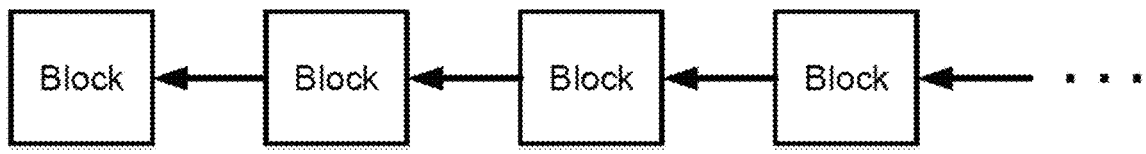
Consensus node verifies if the transaction is valid
3.1. Calculate x
3.2. Calculate C
3.3. Verify C=rG to validate the transaction
4. Add the transaction to the blockchain or reject based on the validity
FIG. 2

300

301: determining one or more data inputs and one or more data outputs for a transaction, wherein the data inputs are associated with input data types respectively, and the data outputs are associated with output data types respectively

302: encrypting the input data types and the output data types

303: committing each of the encrypted input data types and the encrypted output data types with a commitment scheme to obtain corresponding commitment values

304: obtaining at least a parameter R based at least on the commitment values

305: submitting the transaction to one or more nodes in a blockchain network with disclosure of the parameter R and without disclosure of the input data types and output data types for the nodes to verify consistency between the input data types and the output data types

401: obtaining, by one or more nodes in a blockchain network, a transaction initiated by an initiator node, wherein:
    the transaction is associated with one or more data inputs and one or more data outputs,
    the data inputs are respectively associated with input data types, and the data outputs are respectively associated with output data types respectively,
    the input data types and the output data types are encrypted and committed to a commitment scheme to obtain corresponding commitment values, and
    the input data types and output data types are not disclosed to the one or more nodes

402: verifying, by the one or more nodes, consistency between the input data types and the output data types

403: in response to determining that the input data types and the output data types are consistent, adding, by the one or more nodes, the transaction to the blockchain network

404: in response to determining that the input data types and the output data types are inconsistent, rejecting, by the one or more nodes, the transaction from being added to the blockchain network

FIG. 4

SYSTEM AND METHOD FOR INFORMATION PROTECTION

CROSS REFERENCE TO RELATED APPLICATION

This application is a national phase application of International Application No. PCT/CN2018/117548, filed on Nov. 27, 2018, the contents of which are incorporated by reference in its entirety.

TECHNICAL FIELD

This disclosure generally relates to methods and devices for information protection.

BACKGROUND

Privacy is important to communications and data transfers among various users. Without protection, the users are exposed to the risk of identity theft, illegal transfer, or other potential losses. The risk becomes even greater when the communications and transfers are implemented online, because of the free access of online information.

SUMMARY

Various embodiments of the present disclosure include systems, methods, and non-transitory computer readable media for information protection.

According to one aspect, a computer-implemented method for information protection comprises: determining one or more data inputs and one or more data outputs for a transaction, wherein the data inputs are associated with input data types respectively, and the data outputs are associated with output data types respectively; encrypting the input data types and the output data types; committing each of the encrypted input data types and the encrypted output data types with a commitment scheme to obtain corresponding commitment values; obtaining at least a parameter R based at least on the commitment values; and submitting the transaction to one or more nodes in a blockchain network with disclosure of the parameter R and without disclosure of the input data types and output data types for the nodes to verify consistency between the input data types and the output data types.

In some embodiments, encrypting the input data types and the output data types comprises encrypting the input data types and the output data types with a hash function.

In some embodiments, the commitment scheme comprises a Pedersen commitment.

In some embodiments, the commitment scheme comprises at least a blinding factor; and the blinding factor changes with time of committing the encrypted input data types and the encrypted output data types.

In some embodiments, the nodes are caused to verify the consistency between the input data types and the output data types without knowledge of the input data types and output data types.

In some embodiments, the transaction is based at least on an Unspent Transaction Outputs (UTXO) model; and the data inputs and the data outputs comprise types of one or more assets undergoing the transaction.

In some embodiments, the commitment scheme comprises a plurality of blinding factors respectively corresponding to the input data types and the output data types; and obtaining at least the parameter R based at least on the commitment values comprises: obtaining differences between pairs of the commitment values; concatenating the obtained differences; encrypting the concatenated differences with a hash function to obtain an encryption value x; and obtaining the parameter R based at least on the encryption value x and differences between pairs of the blinding factors.

In some embodiments, submitting the transaction to the one or more nodes in the blockchain network with disclosure of the parameter R and without disclosure of the input data types and output data types for the nodes to verify consistency between the input data types and the output data types comprises submitting the transaction to the one or more nodes in the blockchain network with disclosure of the parameter R and without disclosure of the input data types and output data types to cause the nodes to: obtain the parameter R and a basepoint G; obtain differences between pairs of the commitment values; concatenate the obtained differences; encrypt the concatenated differences with a hash function to obtain an encryption value x; obtain a sum C of polynomials based at least on the obtained differences and the encryption value x; in response to determining that the sum C is equal to a product of the parameter R and the basepoint G, determine that the input data types and the output data types are consistent; and in response to determining that the sum C is not equal to a product of the parameter R and the basepoint G, determine that the input data types and the output data types are inconsistent.

According to another aspect, a non-transitory computer-readable storage medium stores instructions to be executed by a processor to cause the processor to perform operations comprising: determining one or more data inputs and one or more data outputs for a transaction, wherein the data inputs are associated with input data types respectively, and the data outputs are associated with output data types respectively; encrypting the input data types and the output data types; committing each of the encrypted input data types and the encrypted output data types with a commitment scheme to obtain corresponding commitment values; obtaining at least a parameter R based at least on the commitment values; and submitting the transaction to one or more nodes in a blockchain network with disclosure of the parameter R and without disclosure of the input data types and output data types for the nodes to verify consistency between the input data types and the output data types.

According to another aspect, a system for information protection comprises a processor and a non-transitory computer-readable storage medium coupled to the processor, the storage medium storing instructions to be executed by the processor to cause the system to perform operations comprising: determining one or more data inputs and one or more data outputs for a transaction, wherein the data inputs are associated with input data types respectively, and the data outputs are associated with output data types respectively; encrypting the input data types and the output data types; committing each of the encrypted input data types and the encrypted output data types with a commitment scheme to obtain corresponding commitment values; obtaining at least a parameter R based at least on the commitment values; and submitting the transaction to one or more nodes in a blockchain network with disclosure of the parameter R and without disclosure of the input data types and output data types for the nodes to verify consistency between the input data types and the output data types.

According to another aspect, a computer-implemented method for information protection comprises: obtaining, by one or more nodes in a blockchain network, a transaction initiated by an initiator node. The transaction is associated with one or more data inputs and one or more data outputs. The data inputs are respectively associated with input data types, and the data outputs are respectively associated with output data types respectively. The input data types and the output data types are encrypted and committed to a commitment scheme to obtain corresponding commitment values. The input data types and output data types are not disclosed to the one or more nodes. The information protection method further comprises: verifying, by the one or more nodes, consistency between the input data types and the output data types; in response to determining that the input data types and the output data types are consistent, adding, by the one or more nodes, the transaction to the blockchain network; and in response to determining that the input data types and the output data types are inconsistent, rejecting, by the one or more nodes, the transaction from being added to the blockchain network.

In some embodiments, verifying the consistency between the input data types and the output data types comprises: obtaining a parameter R and a basepoint G; obtaining differences between pairs of the commitment values; concatenating the obtained differences; encrypting the concatenated differences with a hash function to obtain an encryption value x; obtaining a sum C of polynomials based at least on the obtained differences and the encryption value x; and determining if the sum C is equal to a product of the parameter R and the basepoint G.

In some embodiments, the method further comprises: in response to determining that the sum C is equal to the product of the parameter R and the basepoint G, determining that the input data types and the output data types are consistent; and in response to determining that the sum C is not equal to the product of the parameter R and the basepoint G, determining that the input data types and the output data types are inconsistent.

In some embodiments, the one or more nodes comprise consensus nodes.

According to another aspect, a non-transitory computer-readable storage medium stores instructions to be executed by a processor to cause the processor to perform operations comprising: obtaining, by one or more nodes in a blockchain network, a transaction initiated by an initiator node. The transaction is associated with one or more data inputs and one or more data outputs. The data inputs are respectively associated with input data types, and the data outputs are respectively associated with output data types respectively. The input data types and the output data types are encrypted and committed to a commitment scheme to obtain corresponding commitment values. The input data types and output data types are not disclosed to the one or more nodes. The operations further comprise: verifying, by the one or more nodes, consistency between the input data types and the output data types; in response to determining that the input data types and the output data types are consistent, adding, by the one or more nodes, the transaction to the blockchain network; and in response to determining that the input data types and the output data types are inconsistent, rejecting, by the one or more nodes, the transaction from being added to the blockchain network.

According to another aspect, a system for information protection comprises a processor and a non-transitory computer-readable storage medium coupled to the processor, the storage medium storing instructions to be executed by the processor to cause the system to perform operations comprising: obtaining, by one or more nodes in a blockchain network, a transaction initiated by an initiator node. The transaction is associated with one or more data inputs and one or more data outputs. The data inputs are respectively associated with input data types, and the data outputs are respectively associated with output data types respectively. The input data types and the output data types are encrypted and committed to a commitment scheme to obtain corresponding commitment values. The input data types and output data types are not disclosed to the one or more nodes. The operations further comprise: verifying, by the one or more nodes, consistency between the input data types and the output data types; in response to determining that the input data types and the output data types are consistent, adding, by the one or more nodes, the transaction to the blockchain network; and in response to determining that the input data types and the output data types are inconsistent, rejecting, by the one or more nodes, the transaction from being added to the blockchain network.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2 illustrates exemplary steps for transaction initiation and verification, in accordance with various embodiments.

FIG. 3 illustrates a flowchart of an exemplary method for information protection, in accordance with various embodiments.

FIG. 4 illustrates a flowchart of an exemplary method for information protection, in accordance with various embodiments.

DETAILED DESCRIPTION

Figure 1:
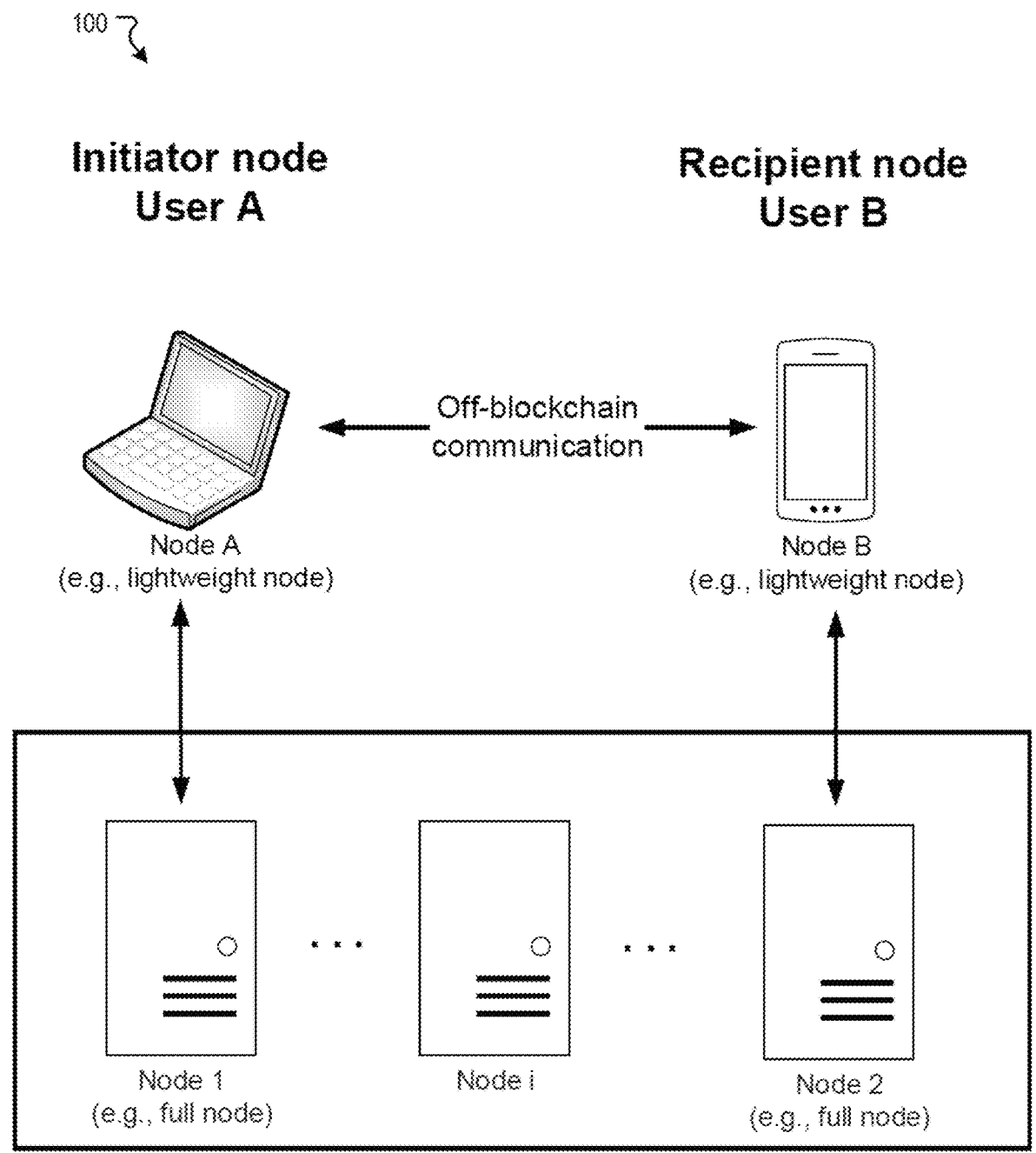
FIG. 1 illustrates an exemplary system for information protection, in accordance with various embodiments.

Blockchain may be considered as a decentralized database, commonly referred to as a distributed ledger because the operation is performed by various nodes (e.g., computing devices) in a network. Any information may be written to the blockchain and saved or read from ft. Anyone may set up a server and join the blockchain network to become a node. Any node may contribute computing power to maintain the blockchain by performing complex computations, such as hash calculation to add a block to a current blockchain, and the added block may contain various types of data or information. The node that contributed the computing power for the added block may be rewarded with a token (e.g., digital currency unit). Since the blockchain has no central node, each node is equal and holds the entire blockchain database.

Nodes are, for example, computing devices or large computer systems that support the blockchain network and keep it running smoothly. Nodes may be run by individuals or groups of people who contribute money towards buying powerful computer systems, known as mining rigs. There are two types of nodes, full nodes and lightweight nodes. Full nodes keep a complete copy of the blockchain. The full nodes on the blockchain network validate transactions and blocks they receive and relay them to connected peers for providing consensus verification of the transactions. Lightweight nodes, on the other hand, only download a fraction of the blockchain. For example, lightweight nodes are used for digital currency transactions. A lightweight node will communicate to a full node when it wants to transact.

This decentralization property can help prevent the emergence of a management center in a controlled position. For example, the maintenance of the bitcoin blockchain is performed by the network of communication nodes of the bitcoin software in the running area. That is, instead of banks, institutions, or administrators in the traditional sense, multiple intermediaries exist in a form of computer servers executing bitcoin software. These computer servers form a network connected via the Internet, wherein anyone can potentially join the network. Transactions accommodated by the network may be of a form: "user A wants to send Z bitcoins to user B," wherein the transactions are broadcast to the network using readily available software applications. The computer servers function as bitcoin servers that are operable to validate these financial transactions, add a record of them to their copy of the ledger, and then broadcast these ledger additions to other servers of the network.

Maintaining the blockchain is referred to as "mining," and those who do such maintenance are rewarded with newly created bitcoins and transaction fees as aforementioned. For example, nodes may determine if the transactions are valid based on a set of rules the blockchain network has agreed to. Miners may be located on any continent and process payments by verifying each transaction as valid and adding it to the blockchain. Such verification is achieved via consensus provided by a plurality of miners and assumes that there is no systematic collusion. In the end, all data will be consistent, because the computation has to meet certain requirements to be valid and all nodes will be synchronized to ensure that the blockchain is consistent.

Through the mining process, transactions such as asset transfers are verified and added to a growing chain of blocks of a blockchain by network nodes. By traversing the entire blockchain, the verification may include, for example, whether the paying party has access to the transferring asset, whether the asset had been spent before, whether the transferring amount is correct, etc. For example, in a hypothetical transaction (e.g., a transaction of bitcoins under a UTXO (unspent transaction output) model) signed off by a sender, the proposed transaction may be broadcast to the blockchain network for mining. A miner needs to check if the transaction is eligible to be executed according to the blockchain history. If the sender's wallet balance has sufficient funds according to the existing blockchain history, the transaction is considered valid and can be added to the block. Once verified, the asset transfers may be included in the next block to be added to the blockchain.

A block is much like a database record. Each time writing data creates a block. These blocks are linked and protected using cryptography to become interconnected networks. Each block is connected to the previous block, which is also the origin of the name "blockchain." Each block usually contains the cryptographic hash of the previous block, the generation time, and the actual data. For instance, each block contains two parts: a block header to record the feature value of the current block, and a body to record actual data (e.g., transaction data). The chain of blocks are linked via the block headers. Each block header may contain multiple feature values, such as version, previous block hash, merkle root, timestamp, difficulty target, and nonce. The previous block hash contains not only the address of the previous block, but also the hash of the data inside the previous block, thus making the blockchains immutable. The nonce is a number which, when included, yields a hash with a specified number of leading zero bits.

For mining, the hash of the contents of the new block is taken by a node. The nonce (e.g., random string) is appended to the hash to obtain a new string. The new string is hashed again. The final hash is then compared to the difficulty target (e.g., a level) and determined whether the final hash is actually less than the difficulty target or not. If not, then the nonce is changed and the process repeats again. If yes, then the block is added to the chain and the public ledger is updated and alerted of the addition. The node responsible for the successful addition is rewarded with bitcoins, for example, by adding a reward transaction to itself into the new block (known as coinbase generation).

That is, for every output "Y", if k is chosen from a distribution with high min-entropy it is infeasible to find an input x such that $H(k|x)=Y$, where K is the nonce, x is the hash of the block, Y is the difficulty target, and "|" denotes concatenation. On account of cryptographic hashes being essentially random, in the sense that their output cannot be predicted from their inputs, there is only one known way to find the nonce: to try out integers one after the other, for example 1, then 2, then 3, and so on, which may be known as brute-force. The larger the number of leading zeros, the longer on average it will take to find a requisite nonce Y. In one example, the bitcoin system constantly adjusts the number of leading zeros, so that the average time to find a nonce is about ten minutes. That way, as processing capabilities of computing hardware increase with time, over the years, the bitcoin protocol will simply require more leading zero bits to make mining always take a duration of about ten minutes to implement.

As described, hashing is an important cornerstone for blockchain. The hash algorithm can be understood as a function that compresses messages of any length into a fixed-length message digest. More commonly used are MD5 and SHA. In some embodiments, the hash length of the blockchain is 256 bits, which means that no matter what the original content is, a 256-bit binary number is finally calculated. And it can be guaranteed that the corresponding hash is unique as long as the original content is different. For example, the hash of the string "123" is a8fdc205a9f19cc1c7507a60c4f01b13d11d7fd0 (hexadecimal), which has 256 bits when converted to binary, and only "123" has this hash. The hash algorithm in the blockchain is irreversible, that is, the forward calculation is easy (from "123" to a8fdc205a9f19cc1c7507a60c4f01b1 c7507a60c4f01b13d11d7fd0), and the reverse calculation cannot be done even if all computing resources are exhausted. Thus, the hash of each block of the blockchain is unique.

Further, if the content of the block changes, its hash will change. The block and the hash are in one-to-one correspondence, and the hash of each block is specifically calculated for the block header. That is, the feature values of the block headers are connected to form a long string, and then the hash is calculated for the string. For example, "Hash=SHA256 (block header)" is a block hash calculation formula, SHA256 is a blockchain hash algorithm applied to block header. The hash is uniquely determined by the block header, and not the block body. As mentioned above, the block header contains a lot of content, including the hash of the current block, and the hash of the previous block. This means that if the contents of the current block change, or if the hash of the previous block changes, it will cause a hash change in the current block. If hacker modifies a block, the hash of that block changes. In order for a later block to connect to the modified block, the hacker must modify all subsequent blocks in turn, because the next block must contain the hash of the previous block. Otherwise the modified block will be detached from the blockchain. Due to design reasons, hash calculations are time-consuming, and it is almost impossible to modify multiple blocks in a short period of time unless the hacker has mastered more than 51% of the computing power of the entire network. Thus, the blockchain guarantees its own reliability, and once the data is written, it cannot be tampered with.

Once the miner finds the hash (that is, an eligible signature or solution) for the new block, the miner broadcasts this signature to all the other miners (nodes of the blockchain). Other miners now verify in their turn if that solution corresponds with the problem of the sender's block (that is, determine if the hash input actually results in that signature). If the solution is valid, the other miners will confirm the solution and agree that the new block can be added to the blockchain. Thus, the consensus of the new block is reached. This is also known as "proof of work." The block for which consensus has been reached can now be added to the blockchain and is broadcast to all nodes on the network along with its signature. The nodes will accept the block and save it to their transaction data as long as the transactions inside the block correspond correctly with the current wallet balances (transaction history) at that point in time. Every time a new block gets added on top of this block, the addition also counts as another "confirmation" for the blocks before it. For example, if a transaction is included in block 502, and the blockchain is 507 blocks long, it means the transaction has five confirmations (corresponding to blocks 507 to 502). The more confirmations the transaction has, the harder it is for attackers to alter.

In some embodiments, an exemplary blockchain asset system utilizes public-key cryptography, in which two cryptographic keys, one public key and one private key, are generated. The public key can be thought of as being an account number, and the private key can be thought of as being ownership credentials. For example, a bitcoin wallet is a collection of the public and private keys. Ownership of an asset (e.g., digital currency, cash asset, stock, equity, bond) associated with a certain asset address can be demonstrated with knowledge of the private key belonging to the address. For example, bitcoin wallet software, sometimes referred as being "bitcoin client software", allows a given user to transact bitcoins. A wallet program generates and stores private keys and communicates with peers on the bitcoin network.

In blockchain transactions, payers and payees are identified in the blockchain by their public cryptographic keys. For example, most contemporary bitcoin transfers are from one public key to a different public key. In practice hashes of these keys are used in the blockchain and are called "bitcoin addresses." In principle, if a hypothetical attacker person S could steal money from person A by simply adding transactions to the blockchain ledger like "person A pays person S 100 bitcoins," using the users' bitcoin addresses instead of their names. The bitcoin protocol prevents this kind of theft by requiring every transfer to be digitally signed with the payer's private key, and only signed transfers can be added to the blockchain ledger. Since person S cannot forge person A's signature, person S cannot defraud person A by adding an entry to the blockchain equivalent to "person A pays person S 200 bitcoins." At the same time, anyone can verify person A's signature using his/her public key, and therefore that he/she has authorized any transaction in the blockchain where he/she is the payer.

In the bitcoin transaction context, to transfer some bitcoins to user B, user A may construct a record containing information about the transaction through a node. The record may be signed with user A's signing key (private key) and contains user A's public verification key and user B's public verification key. The signature is used to confirm that the transaction has come from the user, and also prevents the transaction from being altered by anyone once it has been issued. The record bundled with other record that took place in the same time window in a new block may be broadcast to the full nodes. Upon receiving the records, the full nodes may work on incorporating the records into the ledge of all transactions that have ever taken place in the blockchain system, adding the new block to a previously-accepted blockchain through the above-described mining process, and validate the added block against the network's consensus rules.

User A's asset to be transferred may be in a form of UTXO (unspent transaction output). UTXO is a blockchain object model. Under UTXO, assets are represented by outputs of blockchain transactions that have not been spent, which can be used as inputs in new transactions. To spend (transact) the asset, the user has to sign off with the private key. Bitcoin is an example of a digital currency that uses the UTXO model. In the case of a valid blockchain transaction, unspent outputs may be used to effect further transactions. In some embodiments, only unspent outputs may be used in further transactions to prevent double spending and fraud. For this reason, inputs on a blockchain are deleted when a transaction occurs, whilst at the same time, outputs are created in the form of UTXOs. These unspent transaction outputs may be used (by the holders of private keys, for example, persons with digital currency wallets) for the purpose of future transactions.

Since the blockchain and other similar ledgers are completely public, the blockchain itself has no privacy protection. The public nature of P2P network means that, while those who use it are not identified by name, linking transactions to individuals and companies is feasible. For example, in cross-border remittances or in the supply chain, asset types have an extremely high level of privacy protection value, because with the asset type information, it is possible to infer the specific location and identities of the transaction parties. Asset type may comprise, for example, money, digital currency, contract, deed, medical record, customer detail, stock, bond, equity, or the type of any other asset that can be described in digital form. Though the UTXO model provides anonymity to the identities and transaction amounts, and has been applied to Monero and Zcash, the transaction asset type remains unprotected. Thus, a technical problem address by the present disclosure is how to protect online information such as the privacy of asset type in transactions. The disclosed systems and methods can be integrated into the UTXO model to provide privacy protection for a variety of transaction contents.

During transactions, information protection is important to secure user privacy, and transaction asset type is one type of information that has lacked protection. FIG. 1 shows an exemplary system 100 for information protection, in accordance with various embodiments. As shown, a blockchain network may comprise a plurality of nodes (e.g., full nodes implemented in servers, computers, etc.). For some blockchain platform (e.g., NEO), full nodes with certain level of voting power may be referred to as consensus nodes, which assume the responsibility of transaction verification. In this disclosure, full nodes, consensus nodes, or other equivalent nodes can verify the transaction.

Also, as shown in FIG. 1, user A and user B may use corresponding devices, such as laptops and mobile phones serving as lightweight nodes to perform transactions. For example, user A may want to transact with user B by transferring some asset in user A's account to user B's account. User A and user B may use corresponding devices installed with an appropriate blockchain software for the transaction. User A's device may be referred to as an initiator node A that initiates a transaction with user B's device referred to as recipient node B. Node A may access the blockchain through communication with node 1, and Node B may access the blockchain through communication with node 2. For example, node A and node B may submit transactions to the blockchain through node 1 and node 2 to request adding the transactions to the blockchain. Off the blockchain, node A and node B may have other channels of communication. For example, node A and node B may obtain each other's public key through regular internet communication.

Each of the nodes in FIG. 1 may comprise a processor and a non-transitory computer-readable storage medium storing instructions to be executed by the processor to cause the node (e.g., the processor of the node) to perform various steps for information protection described herein. The each node may be installed with a software (e.g., transaction program) and/or hardware (e.g., wires, wireless connections) to communicate with other nodes and/or other devices. Further details of the node hardware and software are described later with reference to FIG. 5.

FIG. 2 illustrates exemplary steps for transaction initiation and verification, in accordance with various embodiments.

The transaction initiation may be implemented by the initiator node. In some embodiments, each type of asset type may be mapped or assigned to a unique identification. For example, the unique identification may be a serial number sn computed in the following way:

Step 1.2 sn=Hash (asset type)

where Hash( ) is a hash function. Further, the asset type may be encrypted by a commitment scheme (e.g., Pedersen commitment) as follows:

Step 1.3 C(sn)=r×G+sn×H where r is a random blinding factor (alternatively referred to as binding factor) that provides hiding, G and H are the publicly agreed generators/basepoints of the elliptic curve and may be chosen randomly, sn is the value of the commitment, C(sn) is the curve point used as commitment and given to the counterparty, and H is another curve point. That is, G and H may be known parameters to nodes. A "nothing up my sleeve" generation of H may be generated by hashing the basepoint G with a hash function mapping from a point to another with H=Hash(G). H and G are the public parameters of the given system (e.g., randomly generated points on an elliptic curve). The sender node may have published H and G to all nodes. Although the above provides an example of Pedersen commitment in elliptic curve form, various other forms of Pedersen commitment or other commitment schemes may be alternatively used.

A commitment scheme maintains data secrecy but commits to the data so that it cannot be changed later by the sender of the data. If a party only knows the commitment value (e.g., C(sn)), they cannot determine what underlying data values (e.g., sn) have been committing to. Both the data (e.g., sn) and the blinding factor (e.g., r) may be revealed later (e.g., by the initiator node), and a recipient (e.g., consensus node) of the commitment can run the commitment and verify that the committed data matches the revealed data. The blinding factor is present because without one, someone could try guessing at the data.

Commitment schemes are a way for the sender (committing party) to commit to a value (e.g., sn) such that the value committed remains private, but can be revealed at a later time when the committing party divulges a necessary parameter of the commitment process. Strong commitment schemes may be both information hiding and computationally binding. Hiding refers to the notion that a given value sn and a commitment of that value C(sn) should be unrelatable. That is, C(sn) should reveal no information about sn. With C(sn), G, and H known, it is almost impossible to know sn because of the random number r. A commitment scheme is binding if there is no plausible way that two different values can result in the same commitment. A Pedersen commitment is perfectly hiding and computationally binding under the discrete logarithm assumption.

A Pedersen commitment has an additional property: commitments can be added, and the sum of a set of commitments is the same as a commitment to the sum of the data (with a blinding key set as the sum of the blinding keys): C(BF1, data1)+C(BF2, data2)==C(BF1+BF2, data1+data2); C(BF1, data1)−C(BF1, data1)==0. In other words, the commitment preserves addition and the commutative property applies, i.e., the Pedersen commitment is additively homomorphic, in that the underlying data may be manipulated mathematically as if it is not encrypted.

In one embodiment, a Pedersen commitment used to encrypt the input value may be constructed using elliptic curve points. Conventionally, an elliptic curve cryptography (ECC) pubkey is created by multiplying a generator for the group (G) with the secret key (r): Pub=rG. The result may be serialized as a 33-byte array. ECC public keys may obey the additively homomorphic property mentioned before with respect to Pedersen commitments. That is: Pub1+Pub2=(r1+r2(mod n))G.

The Pedersen commitment for the input value may be created by picking an additional generator for the group (H, in the equations below) such that no one knows the discrete log for second generator H with respect to first generator G (or vice versa), meaning no one knows an x such that rG=H. This may be accomplished, for example, by using the cryptographic hash of G to pick H: H=to_point(SHA256 (ENCODE(G))).

Given the two generators G and H, an exemplary commitment scheme to encrypt the input value may be defined as: commitment=rG+aH. Here, r may be the secret blinding factor, and a may be the input value being committing to. Hence, if sn is committed, the above-described commitment scheme C(sn)=r×G+sn×H can be obtained. The Pedersen commitments are information-theoretically private: for any commitment, there exists some blinding factor which would make any amount match the commitment. The Pedersen commitments may be computationally secure against fake commitment, in that the arbitrary mapping may not be computed.

The party (node) that committed the value may open the commitment by disclosing the original value sn and the factor r that completes the commitment equation. The party wishing to open the value C(sn) will then compute the commitment again to verify that the original value shared indeed matches the commitment C(sn) initially received. Thus, the asset type information can be protected by mapping it to a unique serial number, and then encrypting it by Pedersen commitment. The random number r chosen when generating the commitment makes it almost impossible for anyone to infer the type of asset type that is committed according to the commitment value C(sn).

In some embodiments, when incorporating the asset type information protection method under the UTXO model, the consistency of the asset type of input (sn_in) and the asset type of the output (sn_out) of a transaction may be verified to determine the validity of the transaction. For example, the blockchain nodes may reject transactions or blocks that fail the consistency test that sn_in==sn_out. Since the asset type sn is encrypted (e.g., by Pedersen commitment), the consistency test is to verify if C(sn_in)==C(sn_out).

In some embodiments, as shown in FIG. 2, step 1, a UTXO-type transaction may comprise m inputs (e.g., available assets) and n outputs (e.g., transferred assets and remaining assets). The inputs may be denoted as sn_in_k, where $1 \le k \le m$ and the outputs may be denoted as sn_out_k, where $1 \le k \le n$. Some of the outputs may be transferred to the recipient node B, while the remaining outputs may go back to the initiator node A. For example, in a hypothetical transaction, user A may possess a total of 5 bitcoins and 10 stocks in his wallet, and for transaction inputs, sn_in_1=Hash(bitcoin) and sn_in_2=Hash(stock). If user A wants to transfer 3 bitcoins to user B, for transaction outputs, sn_out_1=Hash(bitcoin), sn_out_2=Hash(bitcoin), and sn_out_3=Hash(stock), whereby one of the bitcoin outputs (3 bitcoins) is addressed to user B, and the other bitcoin output (2 bitcoins) and the stock output are addressed back to user A.

Therefore, in some embodiments, the input corresponding asset type may be encrypted in the form:

$C\_in\_k = r\_in\_k \times G + sn\_in\_k \times H$, where $1 \le k \le m$

The output asset type corresponds to the encryption form:

$C\_out\_k = r\_out\_k \times G + sn\_out\_k \times H$, where $1 \le k \le n$

With the asset types being hidden, the transaction initiator needs to prove to the nodes (e.g., full nodes, consensus nodes) that the input asset types of the transaction are respectively consistent with the output asset types. Accordingly, the full nodes can verify if the transaction is valid.

In some embodiments, to initiate a UTXO-type transaction with asset type hidden by Pedersen commitment, the transaction initiator may select appropriate inputs and outputs to perform Steps 2.1 to 2.5 below (corresponding to FIG. 2, step 2):

Step 2.1 Calculate $C\_1 = C\_in\_1 - C\_in\_2,$
$C\_2 = C\_in\_2 - C\_in\_3,$
...
$C\_(m-1) = C\_in\_(m-1) - C\_in\_m,$
$C\_m = C\_out\_1 - C\_out\_2,$
$C\_(m+1) = C\_out\_2 - C\_out\_3,$
...
$C\_(m+n-2) = C\_out\_(n-1) - C\_out\_n,$
$C\_(m+n-1) = C\_in\_1 - C\_out\_1;$ Step 2.2 Calculate x=Hash (C_1 ||C_2||C_3|| . . . ||C_(m+n−1)), where "||" represents concatenation;

Step 2.3 Calculate $C = C\_1 + x \times C\_2 + x^2 \times C\_3 + \ldots + x^{(m+n-2)} \times C\_(m+n-1)$. Note that the polynomial terms may correspond to those in Step 2.1;

Step 2.4 Calculate $R = (r\_in\_1 - r\_in\_2 + x \times (r\_in\_2 - r\_in\_3) + x^2 \times (r\_in\_3 - r\_in\_4) + \ldots + x^{(m+n-2)} \times (r\_in\_1 - r\_out\_1)$. Note that the polynomial terms may correspond to those in Step 2.1, for example, (r_in_1−r_in_2) corresponds to C_in_1−C_in_2;

Step 2.5 Publish R to nodes, e.g., in a broadcast of transaction information.

In some embodiments, to verify that the input asset types and the output asset types are consistent, there must be C=R×G. For example, during transaction verification, the nodes perform Steps 3.1 to 3.3 (corresponding to FIG. 2, Step 3.1-3.3) below to verify if the transaction asset type is consistent:

Step 3.1 Calculate x=Hash (C_1||C_2||C_3|| . . . ||C_(m+n−1));

Step 3.2 Calculate $C = +x \times C\_2 + x^2 \times C\_3 + \ldots + x^{(m+n-2)} \times C\_(m+n-1)$;

Step 3.3 Verify if C=R×G. If C=R×G, the asset type is consistent; otherwise, the asset type is inconsistent, and the transaction is rejected. In some embodiments, the C(sn) may be published to the nodes, and the algorithms of Steps 2.1-2.3 are known to the nodes (e.g., including the node submitting the transaction and the nodes verifying the transaction). Thus, the nodes verifying the transaction may carry out the Steps 3.1 to 3.3 accordingly to perform the verification. Thus, the rejected transaction will not be added to the blockchain. Shown as step 4 in FIG. 2, based on the consistency determination, the nodes may determine whether to add the transaction to the blockchain or reject adding the transaction.

As such, a transaction initiator can submit information for blockchain nodes to verify the transaction based on the consistency of asset types input to and output from the transaction without disclosing the actual asset types and without the ability to alter the submitted information. Allocating serial numbers (e.g., hashes) for each asset type enlarges and randomizes the representation of each asset type, making it difficult for the transaction initiator to forge an asset type to pass the verification. Further, because of the existence of the random number r, the same asset type encrypted at different times are not the same. Applying the Pedersen commitment to encrypt the asset type hash enhances the privacy protection of the asset type to an even higher level. Thus, though Steps 2.1 to 2.5, the transaction initiator can prove to the other nodes that the asset types of the transaction are valid without disclosing the asset types. For instance, differences between the input and output asset types are obtained and based on which, polynomials are constructed, so that the transaction initiator may pass the transformed asset types to the other nodes to prove the consistency of the asset types and the validity of the transaction. At the same time, the probability of the transaction initiator or other node being able to forge the asset type can be neglected, because x is computed by hashing to serve as the base of various exponentials in polynomials. In addition, the disclosure of R allows the other nodes to verify that the asset types in the transaction are consistent without knowing the asset types through Steps 3.1 to 3.3. Therefore, with the disclosed systems and methods, data information can be verified by third-parties while maintaining exceptional privacy protection.

FIG. 3 illustrates a flowchart of an exemplary method 300 for information protection, according to various embodiments of the present disclosure. The method 300 may be implemented by one or more components (e.g., node A) of the system 100 of FIG. 1. The method 300 may be implemented by a system or device (e.g., computer) comprising a processor and a non-transitory computer-readable storage medium (e.g., memory) storing instructions to be executed by the processor to cause the system or device (e.g., the processor) to perform the method 300. The operations of method 300 presented below are intended to be illustrative. Depending on the implementation, the exemplary method 300 may include additional, fewer, or alternative steps performed in various orders or in parallel.

Block 301 comprises: determining one or more data inputs and one or more data outputs for a transaction, wherein the data inputs are associated with input data types respectively, and the data outputs are associated with output data types respectively. See, e.g., Step 1 in FIG. 2. In some embodiments, the transaction is based at least on an Unspent Transaction Outputs (UTXO) model; and the data inputs and the data outputs comprise types of one or more assets undergoing the transaction between a sender (initiator node) and a recipient (recipient node). Asset type may comprise, for example, money, digital currency, contract, deed, medical record, customer detail, stock, bond, equity, or the type of any other asset that can be described in digital form.

Block 302 comprises: encrypting the input data types and the output data types. See, e.g., Step 1.2 described above. In some embodiments, encrypting the input data types and the output data types comprises encrypting each of the input data types and the output data types with a hash function or another one-way function.

Block 303 comprises: committing each of the encrypted input data types and the encrypted output data types with a commitment scheme to obtain corresponding commitment values. See, e.g., Step 1.3 described above. In some embodiments, the commitment scheme comprises a Pedersen commitment. In some embodiments, the commitment scheme comprises at least a blinding factor; and the blinding factor changes with time of committing the encrypted input data types and the encrypted output data types. That is, even the same data (e.g., same data type) committed at different times would be different commitment values due to the changing blinding factor.

Block 304 comprises: obtaining at least a parameter R based at least on the commitment values. See, e.g., Steps 2.1 to 2.4 described above. In some embodiments, the commitment scheme comprises a plurality of blinding factors respectively corresponding to the input data types and the output data types (see, e.g., $r\_in\_k$ and $r\_out\_k$); and obtaining at least the parameter R based at least on the commitment values comprises: obtaining differences between pairs of the commitment values (see, e.g., Step 2.1 for various pairs of the commitment values among the input asset types and the output asset types, for which the differences may be obtained); concatenating the obtained differences (see, e.g., Step 2.2); encrypting the concatenated differences with a hash function to obtain an encryption value x (see, e.g., Step 2.2); and obtaining the parameter R based at least on the encryption value x and differences between pairs of the blinding factors (see, e.g., Step 2.4).

Block 305 comprises: submitting the transaction to one or more nodes in a blockchain network with disclosure of the parameter R and without disclosure of the input data types and output data types for the nodes to verify consistency between the input data types and the output data types. In some embodiments, the nodes are caused to verify the consistency between the input data types and the output data types without knowledge of the input data types and output data types.

In some embodiments, submitting the transaction to the one or more nodes in the blockchain network with disclosure of the parameter R and without disclosure of the input data types and output data types for the nodes to verify consistency between the input data types and the output data types comprises submitting the transaction to the one or more nodes in the blockchain network with disclosure of the parameter R and without disclosure of the input data types and output data types to cause the nodes to: obtain the parameter R and a basepoint G (see, e.g., the G in Step 3.1 H and G may be public parameters available to all nodes); obtain differences between pairs of the commitment values of the input asset types and the output asset types (see, e.g., a step similar to Step 2.1); concatenate the obtained differences (see, e.g., Step 3.1); encrypt the concatenated differences with a hash function to obtain an encryption value x (see, e.g., Step 3.1); obtain a sum C of polynomials based at least on the obtained differences and the encryption value x (see, e.g., Step 3.2); in response to determining that the sum C is equal to a product of the parameter R and the basepoint G, determine that the input data types and the output data types are consistent and add the transaction to the blockchain(see, e.g., Step 3.3); and in response to determining that the sum C is not equal to a product of the parameter R and the basepoint G, determine that the input data types and the output data types are inconsistent and reject adding the transaction to the blockchain (see, e.g., Step 3.3).

FIG. 4 illustrates a flowchart of an exemplary method 400 for information protection, according to various embodiments of the present disclosure. The method 400 may be implemented by one or more components (e.g., node i) of the system 100 of FIG. 1. The node i may comprise a full node implemented on a server. The method 400 may be implemented by a system or device (e.g., computer) comprising a processor and a non-transitory computer-readable storage medium (e.g., memory) storing instructions to be executed by the processor to cause the system or device (e.g., the processor) to perform the method 400. The operations of method 400 presented below are intended to be illustrative. Depending on the implementation, the exemplary method 400 may include additional, fewer, or alternative steps performed in various orders or in parallel.

Block 401 comprises: obtaining, by one or more nodes (e.g., consensus nodes) in a blockchain network, a transaction initiated by an initiator node. The transaction is associated with one or more data inputs and one or more data outputs. The data inputs are respectively associated with input data types, and the data outputs are respectively associated with output data types respectively. The input data types and the output data types are encrypted and committed to a commitment scheme to obtain corresponding commitment values. The input data types and output data types are not disclosed to the one or more nodes.

Block 402 comprises: verifying, by the one or more nodes, consistency between the input data types and the output data types. In some embodiments, verifying the consistency between the input data types and the output data types comprises: obtaining a parameter R and a basepoint G (see, e.g., the R in Step 2.4 and 2.5, the G in Step 3.1); obtaining differences between pairs of the commitment values of the input asset types and the output asset types (see, e.g., a step similar to Step 2.1); concatenating the obtained differences (see, e.g., Step 3.1); encrypting the concatenated differences with a hash function to obtain an encryption value x (see, e.g., Step 3.1); obtaining a sum C of polynomials based at least on the obtained differences and the encryption value x (see, e.g., Step 3.2); and determining if the sum C is equal to a product of the parameter R and the basepoint G (see, e.g., Step 3.3).

Block 403 comprises: in response to determining that the input data types and the output data types are consistent, adding, by the one or more nodes, the transaction to the blockchain network.

Block 404 comprises: in response to determining that the input data types and the output data types are inconsistent, rejecting, by the one or more nodes, the transaction from being added to the blockchain network.

In some embodiments, the method further comprises: in response to determining that the sum C is equal to the product of the parameter R and the basepoint G, determining that the input data types and the output data types are consistent; and in response to determining that the sum C is not equal to the product of the parameter R and the basepoint G, determining that the input data types and the output data types are inconsistent.

As such, a transaction initiator can submit information for blockchain nodes to verify the transaction based on the consistency of asset types input to and output from the transaction without disclosing the actual asset types and without the ability to alter the submitted information. Allocating serial numbers (e.g., hashes) for each asset type enlarges and randomizes the representation of each asset type, making it difficult for the transaction initiator to forge an asset type to pass the verification. Further, because of the existence of the random number r, the same asset type encrypted at different times are not the same. Applying the Pedersen commitment to encrypt the asset type hash enhances the privacy protection of the asset type to an even higher level. Thus, though Steps 2.1 to 2.5, the transaction initiator can prove to the other nodes that the asset types of the transaction are valid without disclosing the asset types. For instance, differences between the input and output asset types are obtained and based on which, polynomials are constructed, so that the transaction initiator may pass the transformed asset types to the other nodes to prove the consistency of the asset types and the validity of the transaction. At the same time, the probability of the transaction initiator or other node being able to forge the asset type can be neglected, because x is computed by hashing to serve as the base of various exponentials in polynomials. In addition, the disclosure of R allows the other nodes to verify that the asset types in the transaction are consistent without knowing the asset types through Steps 3.1 to 3.3. Therefore, with the disclosed systems and methods, data information can be verified by third-parties while maintaining exceptional privacy protection.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
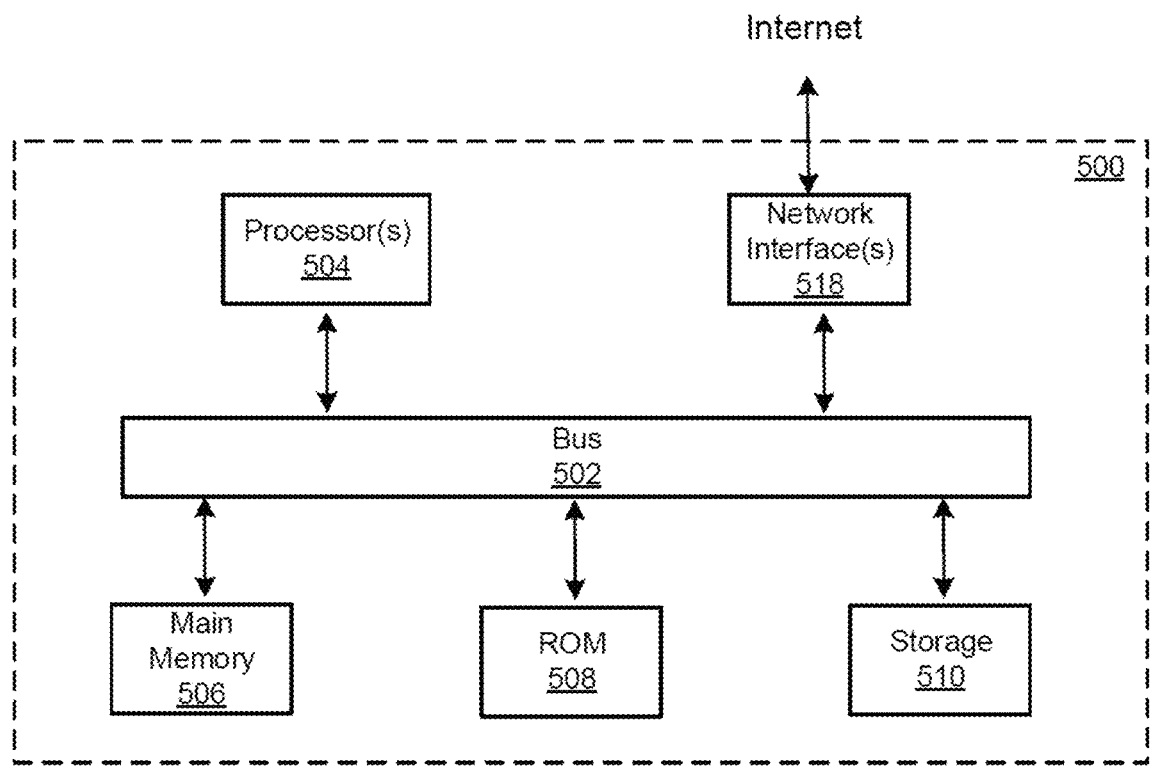
FIG. 5 illustrates a block diagram of an exemplary computer system in which any of the embodiments described herein may be implemented.

FIG. 5 is a block diagram that illustrates a computer system 500 upon which any of the embodiments described herein may be implemented. The system 500 may be implemented in any of the nodes described herein and configured to perform corresponding steps for information protection methods. The computer system 500 includes a bus 502 or other communication mechanism for communicating information, one or more hardware processor(s) 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor(s) 504. Main memory 506 also may be used for storing temporary variables or other intermediate information during execution of instructions to be executed by processor(s) 504. Such instructions, when stored in storage media accessible to processor(s) 504, render computer system 500 into a special-purpose machine that is customized to perform the operations specified in the instructions. The computer system 500 further includes a read only memory (ROM) 508 or other static storage device coupled to bus 502 for storing static information and instructions for processor(s) 504. A storage device 510, such as a magnetic disk, optical disk, or USB thumb drive (Flash drive), etc., is provided and coupled to bus 502 for storing information and instructions.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the operations, methods, and processes described herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a network interface 518 coupled to bus 502. Network interface 518 provides a two-way data communication coupling to one or more network links that are connected to one or more local networks. For example, network interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

The computer system 500 can send messages and receive data, including program code, through the network(s), network link and network interface 518. In the Internet example, a server might transmit a requested code for an application program through the Internet, the ISP, the local network and the network interface 518.

The received code may be executed by processor(s) 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some exemplary embodiments, the processors or processor-implemented engines may be located in a single geographic location (e.g., within a home environment, an office environment, or a server farm). In other exemplary embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The invention claimed is:

1. A computer-implemented method for information protection, comprising:
   obtaining, by one or more nodes in a blockchain network, a transaction initiated by an initiator node, wherein:
      the transaction is associated with one or more data inputs and one or more data outputs, the data inputs are respectively associated with input data types, and the data outputs are respectively associated with output data types respectively, the input data types and the output data types are encrypted and committed to a commitment scheme to obtain corresponding commitment values, the commitment scheme comprises at least a blinding factor, the blinding factor changes with time of committing the encrypted input data types and the encrypted output data types, and the input data types and output data types are not disclosed to the one or more nodes;

verifying, by the one or more nodes, consistency between the input data types and the output data types; and in response to determining that the input data types and the output data types are consistent, adding, by the one or more nodes, the transaction to the blockchain network; or in response to determining that the input data types and the output data types are inconsistent, rejecting, by the one or more nodes, the transaction from being added to the blockchain network.

2. The method of claim 1, wherein verifying the consistency between the input data types and the output data types comprises:

obtaining a parameter R and a basepoint G;

obtaining differences between pairs of the commitment values;

concatenating the obtained differences;

encrypting the concatenated differences with a hash function to obtain an encryption value x;

obtaining a sum C of polynomials based at least on the obtained differences and the encryption value x; and determining if the sum C is equal to a product of the parameter R and the basepoint G.

3. The method of claim 2, further comprising:

in response to determining that the sum C is equal to the product of the parameter R and the basepoint G, determining that the input data types and the output data types are consistent; and in response to determining that the sum C is not equal to the product of the parameter R and the basepoint G, determining that the input data types and the output data types are inconsistent.

4. The method of claim 1, wherein the commitment scheme comprises a Pedersen commitment.

5. The method of claim 1, wherein: the input data types and the output data types are encrypted with a hash function.

6. The method of claim 1, wherein:

the transaction is based at least on an Unspent Transaction Outputs (UTXO) model; and the data inputs and the data outputs comprise types of one or more assets undergoing the transaction.

7. A non-transitory computer-readable storage medium storing instructions to be executed by a processor to cause the processor to perform operations comprising:

obtaining, by one or more nodes in a blockchain network, a transaction initiated by an initiator node, wherein:

the transaction is associated with one or more data inputs and one or more data outputs, the data inputs are respectively associated with input data types, and the data outputs are respectively associated with output data types respectively, the input data types and the output data types are encrypted and committed to a commitment scheme to obtain corresponding commitment values, the commitment scheme comprises at least a blinding factor, the blinding factor changes with time of committing the encrypted input data types and the encrypted output data types, and the input data types and output data types are not disclosed to the one or more nodes;

verifying, by the one or more nodes, consistency between the input data types and the output data types; and in response to determining that the input data types and the output data types are consistent, adding, by the one or more nodes, the transaction to the blockchain network; or in response to determining that the input data types and the output data types are inconsistent, rejecting, by the one or more nodes, the transaction from being added to the blockchain network.

8. The storage medium of claim 7, wherein verifying the consistency between the input data types and the output data types comprises:

obtaining a parameter R and a basepoint G;

obtaining differences between pairs of the commitment values;

concatenating the obtained differences;

encrypting the concatenated differences with a hash function to obtain an encryption value x;

obtaining a sum C of polynomials based at least on the obtained differences and the encryption value x; and determining if the sum C is equal to a product of the parameter R and the basepoint G.

9. The storage medium of claim 8, wherein the operations further comprise:

in response to determining that the sum C is equal to the product of the parameter R and the basepoint G, determining that the input data types and the output data types are consistent; and in response to determining that the sum C is not equal to the product of the parameter R and the basepoint G, determining that the input data types and the output data types are inconsistent.

10. The storage medium of claim 7, wherein the commitment scheme comprises a Pedersen commitment.

11. The storage medium of claim 7, wherein: the input data types and the output data types are encrypted with a hash function.

12. The storage medium of claim 7, wherein:

the transaction is based at least on an Unspent Transaction Outputs (UTXO) model; and the data inputs and the data outputs comprise types of one or more assets undergoing the transaction.

13. A system for information protection, comprising a processor and a non-transitory computer-readable storage medium coupled to the processor, the storage medium storing instructions to be executed by the processor to cause the system to perform operations comprising:

obtaining, by one or more nodes in a blockchain network, a transaction initiated by an initiator node, wherein:

the transaction is associated with one or more data inputs and one or more data outputs, the data inputs are respectively associated with input data types, and the data outputs are respectively associated with output data types respectively, the input data types and the output data types are encrypted and committed to a commitment scheme to obtain corresponding commitment values, the commitment scheme comprises at least a blinding factor,
the blinding factor changes with time of committing the encrypted input data types and the encrypted output data types, and
the input data types and output data types are not disclosed to the one or more nodes;
verifying, by the one or more nodes, consistency between the input data types and the output data types; and
in response to determining that the input data types and the output data types are consistent, adding, by the one or more nodes, the transaction to the blockchain network; or in response to determining that the input data types and the output data types are inconsistent, rejecting, by the one or more nodes, the transaction from being added to the blockchain network.

14. The system of claim 13, wherein verifying the consistency between the input data types and the output data types comprises:
obtaining a parameter R and a basepoint G;
obtaining differences between pairs of the commitment values;
concatenating the obtained differences;
encrypting the concatenated differences with a hash function to obtain an encryption value x;
obtaining a sum C of polynomials based at least on the obtained differences and the encryption value x; and
determining if the sum C is equal to a product of the parameter R and the basepoint G.

15. The system of claim 14, wherein the operations further comprise:
in response to determining that the sum C is equal to the product of the parameter R and the basepoint G, determining that the input data types and the output data types are consistent; and
in response to determining that the sum C is not equal to the product of the parameter R and the basepoint G, determining that the input data types and the output data types are inconsistent.

16. The system of claim 13, wherein the commitment scheme comprises a Pedersen commitment.

17. The system of claim 13, wherein: the input data types and the output data types are encrypted with a hash function.

* * * * *